Feb. 19, 1935. D. C. HAMMELL 1,991,851
COMBINATION HEATING, COOLING, FUMIGATION, IRRIGATION,
AND FERTILIZING SYSTEM FOR AGRICULTURAL PURPOSES
Filed June 29, 1932 2 Sheets-Sheet 2
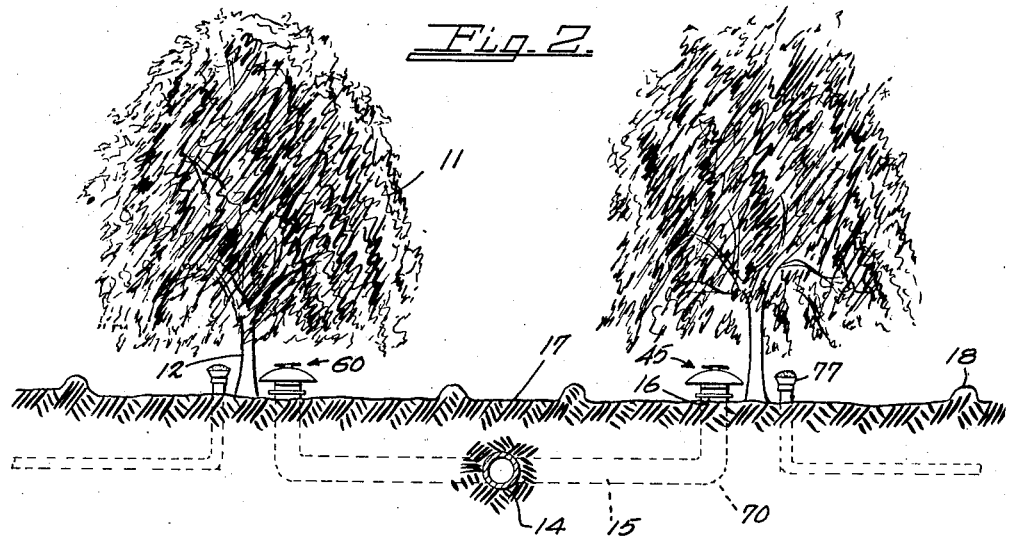
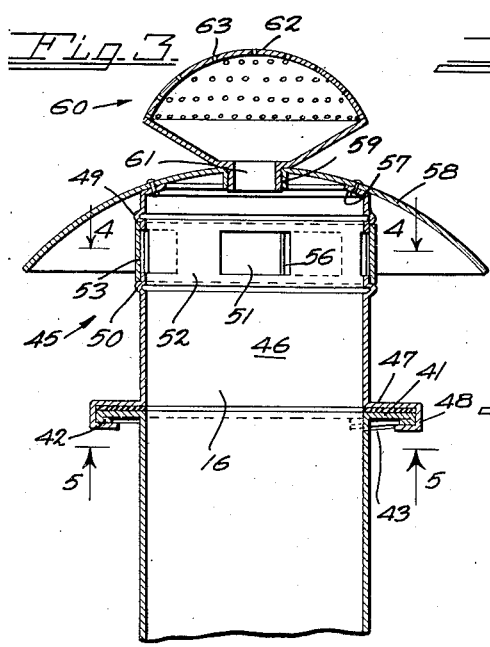
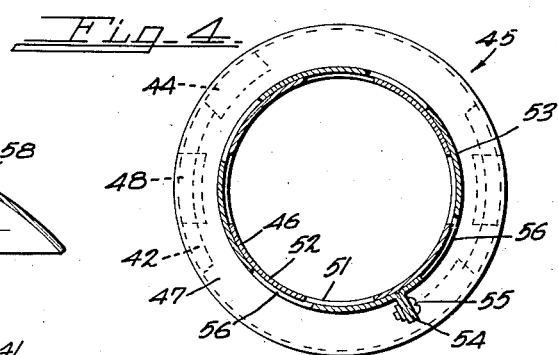
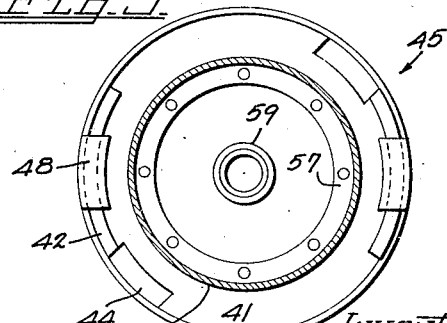

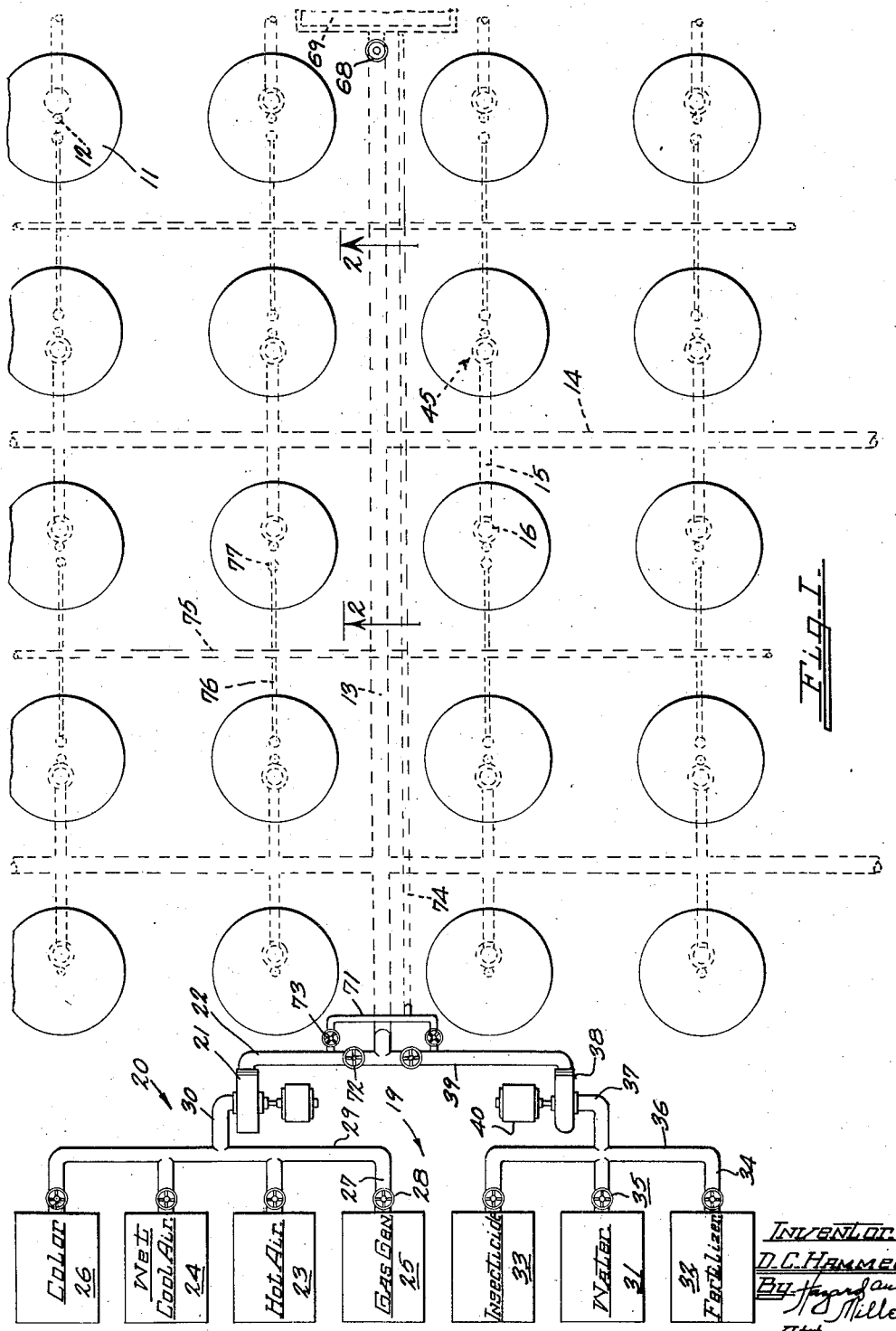

Patented Feb. 19, 1935

1,991,851

UNITED STATES PATENT OFFICE 1,991,851

COMBINATION HEATING, COOLING, FUMI-GATION, IRRIGATION, AND FERTILIZING SYSTEM FOR AGRICULTURAL PURPOSES

Delbert C. Hammell, Los Angeles, Calif.

Application June 29, 1932, Serial No. 619,918

26 Claims. (Cl. 47—1)

My invention relates to a plant equipment or system by which agricultural districts, particularly with fruit trees or the like, can be irrigated by, preferably, underground pipes discharging into basins surrounding each tree and, preferably, through the same pipes heated air may be supplied in freezing weather to prevent damage to the trees by frost. Also, during sudden hot spells or excessive heat, cold or refrigerated air may be forced through the irrigation pipes to each tree to cool the temperature sufficiently to prevent damage by heat too early in the season or by excessive heat during the ripening of the fruit. The cold air may be used to reduce or to prevent such damage. The above mentioned features are some of the main characteristics of my invention and the use of air heating is designed to overcome the objectionable and inadequate features of, particularly, orchard heating, by means of so-called fuel or smudge pots.

In the past it has been a theory of orchard heating that the formation of a dense cloud of smoke was an advantage in preventing radiation of heat from the ground during the cold spells, which are principally at night and when, of course, these smoke clouds are made; but this smoke cloud has a disadvantage the next day of preventing the sunlight from heating the ground and reaching the trees. Moreover, in districts such as in those devoted principally to citrus fruits, the smudging where the smoke is used causes an economic loss in the soot and dirt deposited on household articles, furniture and furnishings, etc., as well as the disagreeable characteristics of the sooty smoke or smudge where oil fuel is used, and the smudging is also a menace to health.

In the matter of orchard heating, an object and feature of my invention is the employment of a central heating plant. This may be designed to generate heat in a much more economical manner than the open fire and smudge pots and, preferably, the heating plant will be employed to heat air, which air may be blown through a piping system with a discharge under each tree. In citrus trees it is now a common practice to allow these to grow in a more or less natural manner with the lower branches practically drooping to the ground, hence the hot air discharged adjacent the trunk of the tree will be more or less confined by the foliage.

As above mentioned, the same pipes which could be used for water irrigation of an orchard may be also used for blowing the hot air to the trees. These pipes are preferably laid underground a sufficient distance below the surface to allow cultivation of the orchard, and when hot air is forced through these, a certain amount of the heat will operate to warm the soil and compensate for the heat radiated from the soil during freezing weather, which is usually on quite still nights. In addition, the hot air discharged at each tree will cause an air circulation having an advantage of preventing the general lowering of the air temperature to a dangerous freezing point.

In regard to the use of the piping system for discharging cooled air, it frequently happens that early in the spring a hot spell of weather of short duration causes a too early development of the buds, then when followed by cool weather, the buds form into the fruit and this fruit is stunted, dropping from the tree at an early date in the summer. By my invention during these sudden hot spells, cooled or refrigerated air could be blown through the pipes and cool the atmospheric conditions adjacent each tree sufficiently to retard the development of the blossoms. It also frequently happens in the summertime during the ripening of the fruit that excessive heat causes a too rapid ripening of the fruit or drying out or evaporation of the moisture content. In this case I may discharge cooled air to maintain a lower temperature at each tree.

Another feature of my invention as applied to the use of heated air is that occasionally a rainfall or heavy fog deposits sufficient moisture on certain types of fruit, causing them to be damaged by the sun heat, and in this case the water may be evaporated from the fruit by blowing heated air to each tree.

Other features of my invention in regard to the blowing of gases through the pipes relate to fumigating the trees in which fumigating gases may be discharged to each tree. For certain types of gases it would be necessary to form hoods over each tree, but I believe that mild forms of fumigation could be used without forming a tent over each individual tree. Also, I can blow gases through the piping system to each tree in order to cause a proper coloring of the fruit when this is green.

As above mentioned, the piping system may be used for ordinary irrigation in which a stand pipe with a discharge head is located adjacent the trunk of each tree and, preferably, a basin is formed by making a furrow around each tree. The discharge heads are individually controllable to irrigate any desired part of an orchard, usually the lowest part first, and gradually working to the high parts. With this system of irrigating, I may also include a liquid fertilizer which may also be forced through the pipes, the irrigation and the liquid fertilizer preferably being driven by pumps.

My invention is also adapted for applying an insecticide by means of a spray, in which case the discharge head may be provided with a spray nozzle discharging jets upwardly of a liquid insecticide into the foliage of the tree.

It is to be understood, however, that a main and important feature of my invention relates to developing an air circulation principally in connection with fruit cultivation. In many cases of a mild frost I am of the opinion that the air blown under each tree without preheating will be sufficient to protect the tree from frost.

My invention is illustrated in the accompanying drawings, in which:

Fig. 1 illustrates diagrammatically a piping system and layout of a central plant suitable for my invention.

Fig. 2 is an elevation showing the pipes and outlets adjacent individual trees.

Fig. 3 is a vertical section through a stand pipe with a discharge head and spray nozzle.

Fig. 4 is a horizontal section on the line 4—4 of Fig. 3 in the direction of the arrows.

Fig. 5 is a horizontal section on the line 5—5 of Fig. 3 in the direction of the arrows.

Fig. 6 is a closure plug to replace the spray nozzle.

In my invention I illustrate the layout of an orchard in which individual trees are designated by the numeral 11, the trunks being indicated at 12. It is quite common in cultivation of fruit, such as the citrus types, to have an underground irrigation system in which there may be employed a relatively large feeder pipe 13 from which extend branch pipes 14 leading to different parts of the orchard, and from each branch pipe there are lateral pipes 15 to each tree. These lateral pipes are indicated as having stand pipes 16, a stand pipe being positioned adjacent the trunk of each tree.

In Fig. 2 the ground level is indicated at 17. The irrigation pipes are usually a sufficient distance below the ground level to allow cultivation and around each tree there is a turned-up furrow 18 to form a basin for the irrigation water.

Referring to Fig. 1, I indicate a central power plant 19 which has on one side a gas blowing equipment 20. This employs a blower 21, and a pipe 22 leading from the blower to the pipe 13. In this central station I employ an air heater 23 which may be of any suitable type, and an air cooler 24. In addition, I may equip the central station with a fumigating gas storage or generator indicated at 25, and storage tanks or generators for coloring gas 26 for giving a color to the fruit. Each of these units, such as the air heater, the cooler, the fumigating gas tanks, and the color gas tanks, has its own discharge pipe 27 with a valve control 28. Each of these pipes leads through a connection pipe 29 to the blower intake 30. The water added to the air in the form of increased humidity is in the form of water vapor in suspension in the air.

The central plant is also preferably provided with a water tank or connection 31, tanks for containing a liquid fertilizer 32 and other tanks for containing a liquid insecticide 33. These, likewise, have discharge pipes 34, each with a control valve 35. The pipes 34 lead to a connecting manifold pipe 36 to an intake 37 of a hydraulic pump 38, this pump discharging through a pipe 39 to the large underground pipe 13. The pump and the blowers are indicated as being electrically driven by electric motors 40.

Referring to the specific details of the stand pipes, these are illustrated as having a flange 41 with a return bend 42 at the edge, a part of this return bend being cam-shaped as indicated at 43. These edges are provided with opposite notches 44. The discharge head 45 has a tubular section 46 with an outwardly extending flange 47, and turn bend fingers 48, which fingers may be inserted through the notches 40 and rotated partly to engage the cams 43 and thus lock the head securely to the lower part of the stand pipe. The upper part of the head is illustrated as having upper and lower beads 49 and 50 with ports 51 between the beads. This forms a neck section 52 extending between the upper and lower beads. A rotatable collar 53 is formed of a strap extending around this neck and having flanges 54 secured underneath by a bolt 55. This strap has ports 56 which may be aligned with the ports 51 to form an opening.

The discharge head is indicated as having an inturned flange 57 at the top, to which is secured a dome-shaped cover 58 to prevent entrance of dirt or leaves into the stand pipe. This hood has a neck 59.

A spray nozzle 60 is secured to the neck 59. The spray nozzle has a threaded end 61 threaded to the neck 59 and is provided with a dome section 62 with a series of perforations 63. If it is desired not to use a spray nozzle, a closure plug 64 having a handle 65 may be inserted into the neck 59 after removal of the spray nozzle to form a closure for the hood.

When the plant is used for irrigating trees, water may be forced by a pump through the piping, in which case the discharge heads at the higher elevations are preferably kept closed until the trees at the lower elevations of the orchard are fully irrigated. These latter may then be turned off and trees in higher elevations irrigated. At the low point of the orchard there is, preferably, a drain valve by which the irrigation pipes may be drained. The water for irrigation is discharged through the ports 51 and 56 of the discharge head, but it is immaterial whether or not any of this water discharges through the spray nozzle.

When it is desired to use the equipment for orchard heating, the air heater is operated to heat the air to a desired temperature, which may be quite high. Air is then blown by the air blower through the piping system and discharged through the discharge heads. In this case the opening of each head should be regulated so that each tree receives an adequate amount of superheated air in order to counteract the effect of the frost. On account of the hot air being led through the underground pipes, the soil, to a certain extent, becomes heated, and such heat replaces that lost by radiation. The air cooler is substantially the reverse of the air heater, except that the air is cooled or refrigerated and blown through the piping system. In this case even blowing unrefrigerated air through the underground pipes would cause a chilling of this air which in some cases would be sufficient to lower the temperature at each tree below the point at which danger may be caused to the fruit crop.

While I have mentioned the use of heated and cooled air, it will be understood that in certain conditions I may employ the equipment and plant for circulating air at the atmospheric temperature. In cases of mild frost sufficient air can be blown underneath the trees to give an air circulation individually to each tree, which air circulation when the temperature of the circulating air is not at the freezing point for the particular tree operates to prevent a freezing of the tree and the fruit. In the procedure, drawing air at atmospheric temperature through the blowers, the heat extracted from the ground will raise the temperature of such air an appreciable amount or, if desired, the air may be drawn from a warm strata or level of air, as it is well known in orchard cultivation that frosts generally occur on still nights and the cold air accumulates at the lower levels in the orchards.

To effectively drain the irrigation pipes, in one of the main pipes or feeders 13 I may employ a drain valve 68 which is indicated as discharging into a drain sump 69. In addition, at the bottom of each stand pipe I may have a small drain opening 70, which is constantly open. This drain opening is insufficient to waste much water during irrigation but will allow the water to slowly drain from the stand pipe and the laterals connected thereto.

While the general layout of plant and piping has been designed to use the irrigation pipes for the fumigating gas and the coloring gas for the fruit and the liquid insecticide, in some cases it will be desirable to have separate small sized pipes with their individual outlets, and for this purpose I show a small branch pipe 71 connected to the pipe 39 which leads from the blowers. Main valves 72 are used in the pipe 39 and secondary valves 73 in the branch pipe 71. This pipe 71 may be much smaller than the pipe 39, and from the pipe 71 there is a small main feeder 74 with branch feeders 75 and small laterals 76 leading to individual stand pipes 77, each having a spray nozzle.

When using a gas for fumigating I may use a cyanide gas but in this case it would probably be necessary to form tents over each tree that is fumigated. There are, however, other gases which are less harmful to the apparatus which could probably be used without forming tents over the trees, and such gases could be used on days when there is but little wind in the orchard. The gases used for coloring the fruit may be any gases which are found suitable, such as those now used in packing houses for giving a color to the more or less unripe or unevenly colored fruit. It is to be noted by my invention that the same pipes and spray nozzles which are suitable for the fumigating and coloring gases may be used for the insecticide. This discharges the insecticide upwardly on to the foliage on the branches and stems of the trees.

At certain times during nearly every season of fruit development it is found that there are a few days in which the air is too dry and tends to dry out the fruit; during such times moisture may be added to the air in the central plant and this moisture-laden air blown through the pipes and discharged through the stand pipes at each tree. This increased humidity in the air would also have a cooling effect. The cooled air may also be used to prevent or reduce the early dropping of fruit which frequently occurs when there are a few hot days while the fruit is quite small. This applies particularly to citrus fruits. The cooled or refrigerated air which may be blown through the pipes after watering will increase the cooling effect on the trees or plants should the air be rather cold and dry by the evaporation. Or, if the air is humidified and cooled it will prevent a too rapid drying of the ground thus allowing the water to soak down to the roots.

Various changes may be made in the details of construction without departing from the scope of the invention as defined by the appended claims.

I claim:

1. In an agricultural method, refrigerating a large body of air, forcing the air under pressure through underground conduits, and discharging the air through a plurality of outlets above the ground level to cool an agricultural crop.

2. In an agricultural method, flowing a liquid through underground conduits to a plurality of discharge outlets above the ground level, then draining the conduits, and subsequently forcing a large body of refrigerated air through the conduits, and discharging such air through the discharge outlets to cool an agricultural crop.

3. A plant for agricultural purposes, comprising a conduit having a plurality of outlets spaced apart, means to flow a liquid through the conduits and to discharge the liquid at the outlets, means to refrigerate a large body of air, means to blow the air under pressure through said conduits and to discharge the refrigerated air through said outlets.

4. A plant for agricultural purposes, comprising an underground conduit having a plurality of outlets spaced apart, the outlets being above the ground level, means to flow a liquid through the conduit and to discharge the liquid at the outlets, means to drain the liquid from the conduit, means to refrigerate a large body of air, means to blow said air under pressure through said conduit and to discharge such refrigerated air at said outlets.

5. A plant for agricultural purposes, comprising an underground conduit system extending from a central plant to various portions of an orchard and having a stand pipe at each tree, each stand pipe having an outlet positioned below the foliage of a tree, means to refrigerate and to supply moisture to the air at the central plant, said central plant having a blower to force the treated air through the conduits and discharge such air at the outlets.

6. A plant for agricultural purposes, comprising a system of underground conduits connected to a central power station, the conduits having connections to each tree in an orchard with a stand pipe extending vertically adjacent the trunk of each tree and having an outlet positioned to discharge underneath the foliage of each tree, means to flow water through the conduit system to discharge at each outlet for irrigation purposes, means to drain the water from the conduits, and an air blowing plant at the central station adapted to blow refrigerated air through the conduit system to the outlets.

7. A plant for agricultural purposes, comprising in combination, an underground conduit system having connections to each tree in an orchard with a stand pipe at each tree and an outlet under the foliage of the tree, the outlets being above the ground level, a central power plant having a connection to the conduit system, with means to flow water through the conduit system and discharge the water at each outlet for irrigation purposes, means at the power plant to heat and cool air, and means to blow such air through the conduit system under pressure and discharge the air at the outlets.

8. A plant as claimed in claim 7, an auxiliary plant having pipes extending through the orchard with an outlet adjacent each tree, each outlet having a nozzle, a plant for supplying fumigating gas, and means to flow such gas through the pipes, a plant for supplying a liquid insecticide, and means to flow such insecticide through the pipes, the fumigating gas and insecticide being discharged through the discharge nozzles at each tree.

9. In an agricultural method to treat a tree or fruit of a tree, the steps comprising pumping an insecticide from a central plant through conduits, and discharging the insecticide through a spray nozzle positioned adjacent the trunk of a tree and underneath the foliage, blowing a gas having fumigating properties through the same conduits and discharging it through the same nozzles, in addition flowing a gas having properties of coloring the fruit through the same conduits and through the same discharge nozzles.

10. In an agricultural method to treat a fruit of a tree comprising pumping a gas having properties of coloring fruit from a central plant through conduits and discharging such gas adjacent the foliage and fruit of the tree.

11. In an agricultural method, flowing a liquid through underground conduits to a plurality of discharge outlets above the ground level, then draining the conduits at their lowest point and subsequently forcing a large body of air through the conduits and discharging the air through the discharge outlets, and regulating the discharge in accordance with the requirements of the particular area surrounding each outlet, in which the air is chilled or refrigerated.

12. In an agricultural method, as claimed in claim 11, in which the air is humidified by a water vapor in suspension.

13. In an agricultural method, flowing water through conduits extending through an agricultural area to a plurality of discharge outlets above the ground level, said outlets being regulated in accordance with the requirement of the area surrounding each outlet as to irrigation, then draining the conduits, subsequently forcing a large body of refrigerated and humidified air through the conduits, and discharging the air through outlets adjusted to supply the requirements of the particular area adjacent each outlet, the humidified air having water vapor in suspension.

14. A plant for agricultural purposes, comprising a system of underground conduits connected to a central power station, the conduits having connections to each tree in an orchard with a stand pipe extending vertically below the foliage of the tree and having an outlet above the ground level, means to adjust the opening in the outlet in accordance with the requirements of the tree independent of the presence of water or air, means to flow water through the conduit system to discharge at each outlet, means to drain water from the conduits, an air blowing plant at the central station, means for refrigerating and humidifying the air at the central plant and blowing such air through the conduits, the air being discharged through the outlets below the foliage of the trees, the humidifying means supplying water vapor in suspension in the air.

15. A plant for agricultural purposes comprising, in combination, a system of underground conduits connected to a central power station, the conduits having connections to each tree in an orchard with a stand pipe extending vertically adjacent the trunk of each tree and having an outlet positioned to discharge beneath the foliage of each tree, each outlet having an adjustable opening, means to flow water through the conduit system to discharge at each outlet for irrigation purposes in accordance with the opening and the requirements of each tree, means to drain water from the conduits at their lowest point, an air blowing plant at the central station connected to blow air through the conduit system to the outlets, said adjustable opening being adapted to permit a regulated discharge of air in accordance with the requirement of each tree, each outlet having an opening operative independent of the pressure of water or air.

16. A plant for agricultural purposes as claimed in claim 15, the central power station having means for refrigerating the air.

17. A plant for agricultural purposes as claimed in claim 15, the central power station having means for humidifying the air by a water vapor in the air.

18. A plant for agricultural purposes comprising conduits with extending connections leading to each tree in an orchard, a stand pipe extending upwardly under the foliage of each tree, each stand pipe having an outlet, a central air supply plant connected to the conduits and having means to blow a large body of air through the conduits under pressure and to discharge such air at the outlets and means to change the size of the outlets in accordance with the requirements of each tree and independent of the air pressure.

19. A plant for agricultural purposes comprising conduits with extending connections leading to each tree in an orchard, a stand-pipe extending upwardly under the foliage of each tree, each stand-pipe having an outlet, a central air supply plant for blowing non-heated air through the conduits under pressure, the said air discharging at each of the outlets.

20. A plant for agricultural purposes as claimed in claim 19, means to humidify the air at the central supply plant whereby the moisture in the air becomes thoroughly distributed and absorbed in such air before discharge from the outlets.

21. A plant for agricultural purposes as claimed in claim 19, a central water pumping plant having means for pumping water through the conduits and discharging the water at each outlet, and means to drain the conduits to permit blowing of air through such conduits.

22. A plant for agricultural purposes comprising conduits with extending connections leading to each tree of an orchard, a stand-pipe extending upwardly under the foliage of each tree, each stand-pipe having an outlet, a central water supply plant for pumping water under pressure through the conduits and discharging the water at each outlet, means to drain the conduits and a central air supply plant connected to the conduits and having means to blow non-heated air through the conduits and at the same time at the central supply plant supplying water for humidifying the air, the said moisture becoming absorbed and distributed into the air before discharge from the outlets.

23. In an agricultural method, forcing water through conduits and discharging such water at individual outlets distributed in an orchard, then draining the water from the conduits, and from a central air pumping plant blowing nonheated air through the conduits.

24. In an agricultural method as claimed in claim 23, at the central air blowing plant humidifying the air and blowing the humidified air through the conduits.

25. In an agricultural method, blowing non-heated air through conduits from a central air blowing plant and discharging such air underneath the foliage of fruit trees.

26. In an agricultural method at a central air blowing plant, humidifying air with water to carry water vapor in the air and blowing non-heated air through conduits to individual trees of an orchard and discharging such air underneath the foliage of orchard trees.

DELBERT C. HAMMELL.